(No Model.)
W. F. BAIRD.
PICKET FENCE.
No. 338,818. Patented Mar. 30, 1886.
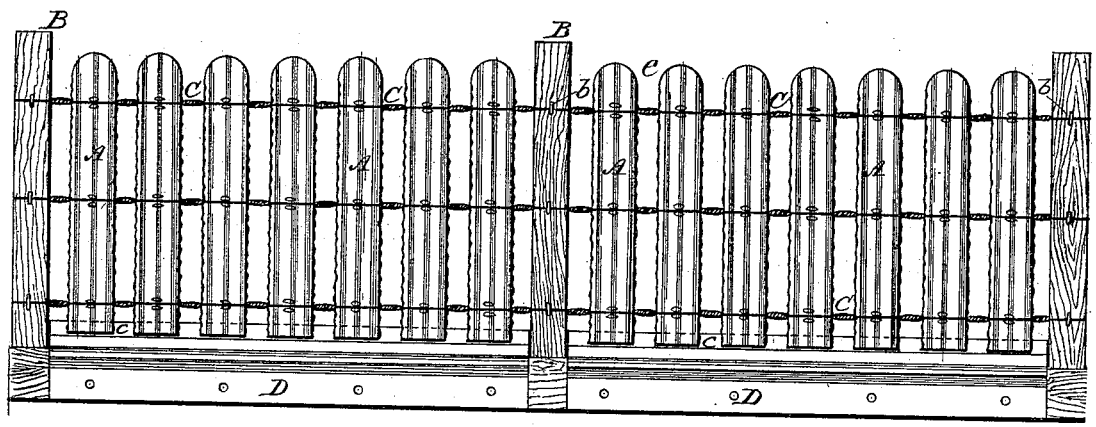
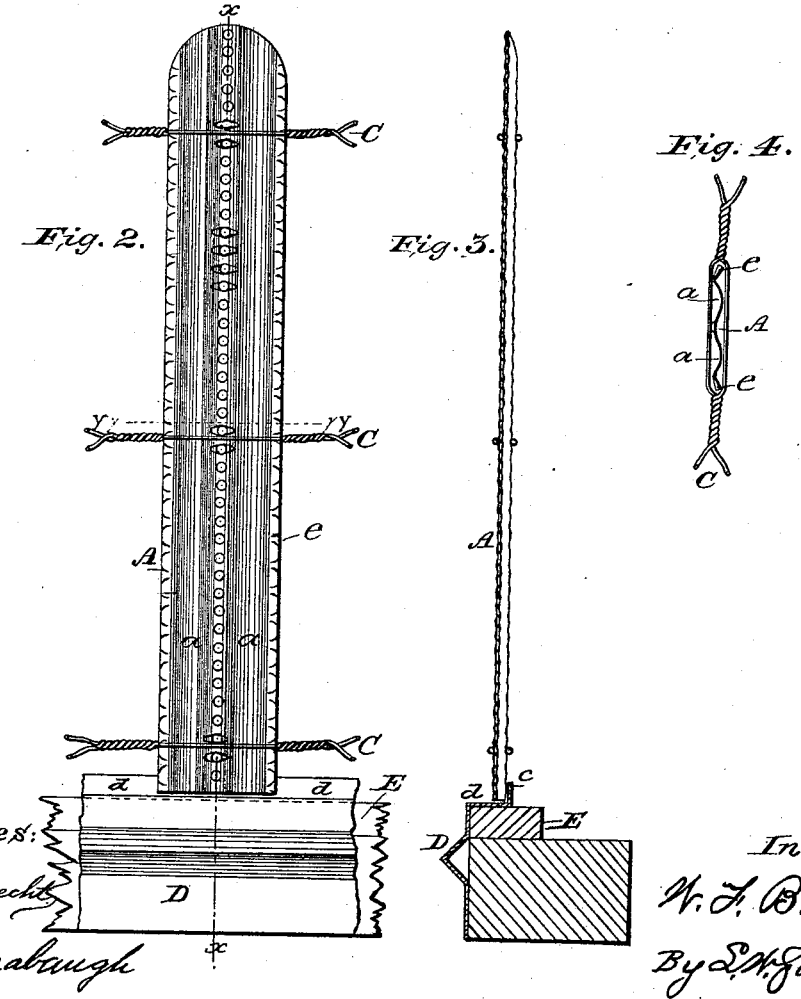

UNITED STATES PATENT OFFICE.

WILLIAM F. BAIRD, OF BURLINGTON, IOWA.

PICKET-FENCE.

SPECIFICATION forming part of Letters Patent No. 338,818, dated March 30, 1886.

Application filed October 2, 1884. Serial No. 144,560. (No model.)

*To all whom it may concern:*

Be it known that I, WILLIAM F. BAIRD, a citizen of the United States, residing at Burlington, in the county of Des Moines and State of Iowa, have invented certain new and useful Improvements in Picket-Fences, of which the following is a specification, reference being had therein to the accompanying drawings.

My invention relates to improvements in picket-fences, the object of which is to provide a strong, light, durable, and artistic fence at a comparatively small expense.

Figure 1 is a side elevation of my improved fence. Fig. 2 is a side elevation of one of my pickets. Fig. 3 is a vertical longitudinal sectional view taken on the line $x$ $x$ of Fig. 2. Fig. 4 is a sectional view taken on the line $y$ $y$ of Fig. 2.

Referring to the drawings, A are the pickets; B, the fence-posts; C, the wires which support the pickets, and D the sheet-metal base, all of which will now be described in detail.

The pickets A are made of sheet-iron or other suitable material, and are provided with corrugations $a$, which extend in the direction of the length of the pickets. These corrugations may be large or small, sharp and angular, or rounded and undulating, as desired, the object being to give strength and rigidity to the picket, so as to resist the pressure of animals or high winds. The edges of the pickets are flanged, as indicated by the letter $e$, Figs. 1 and 2, and the flanges are scalloped, as indicated in Fig. 1, or crimped, as indicated in Fig. 2 of the drawings, and provided with indentations or cross-corrugations, which will prevent the picket from sliding down and becoming detached from the sustaining-wires. These pickets above described are readily rolled or stamped into shape from sheet-iron, which may be galvanized or protected from moisture in any suitable manner.

The pickets may be round or pointed at the top, or finished with any fanciful design or configuration.

The pickets are supported by the wires C, which in turn are secured to the posts B in the manner in which the ordinary wire fence is secured to the posts. The wires may be galvanized, and are arranged in sets of two or more strands, which are twisted together for a short distance. A picket is then placed between the wires of each group, and the wires are again twisted to form a spacing or division between the pickets. Another picket is inserted, and so on until the fence is built.

The pickets may be woven with the wires in the shop, so as to form sections of a fence of any convenient or desirable length, which can be rolled up and transported from place to place, and can be readily secured to the posts by the staples $b$.

D is the base-plate, which is made of sheet-iron, and may be corrugated in any convenient and desirable manner. The base-plate is secured to the sill or base E.

The upper edge of the base D is bent to form the flange $c$, which serves to keep the pickets in line, while the offset or shoulder $d$ of the base serves to assist in supporting the fence when the wires are expanded by the heat of the sun, as they have a tendency to sag when thus expanded. The shoulder or offset $d$ serves also as a water-shed, and its rear portion or edge should be slightly higher than the front portion or edge.

Having thus described my invention, what I claim, and desire to secure by Letters Patent, is—

The combination, with the fence-sections composed of corrugated pickets and intertwining wires, of the fence-posts B, the sill E, and the flanged plate D, corrugated longitudinally and forming a sheathing for the sill and a support for the pickets, substantially as and for the purposes specified.

In testimony whereof I affix my signature in presence of two witnesses.

WILLIAM F. BAIRD.

Witnesses:
H. H. SPENCE,
C. P. J. MCINTURFF.